F. TAMBORELLO.
VEHICLE BRAKE MECHANISM.
APPLICATION FILED APR. 21, 1920.
1,393,051.
Patented Oct. 11, 1921.
3 SHEETS—SHEET 2.
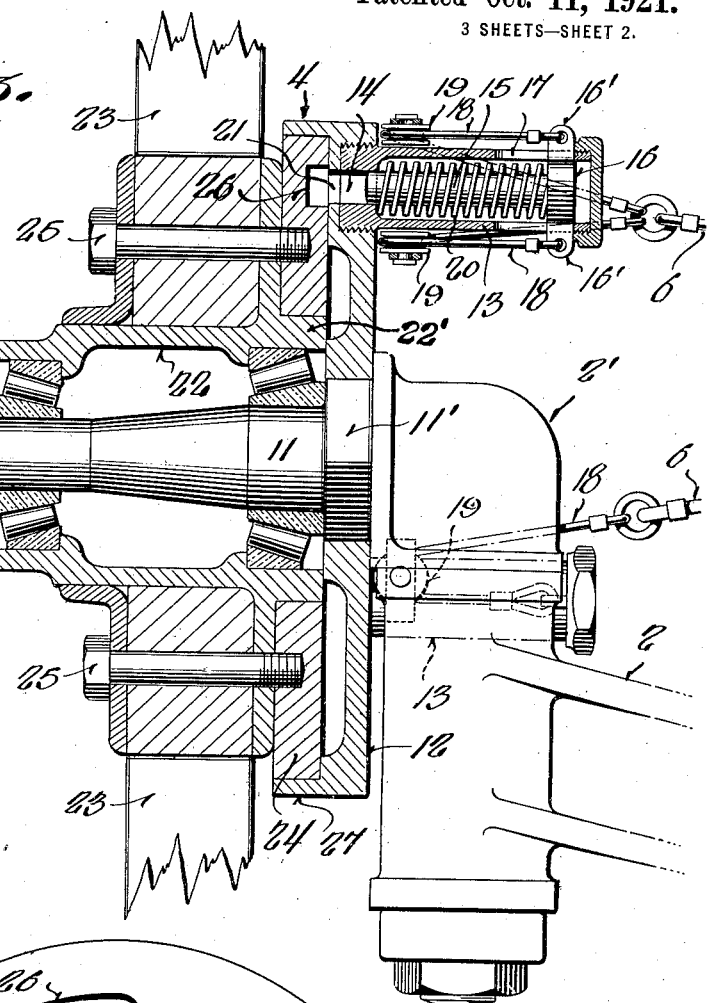
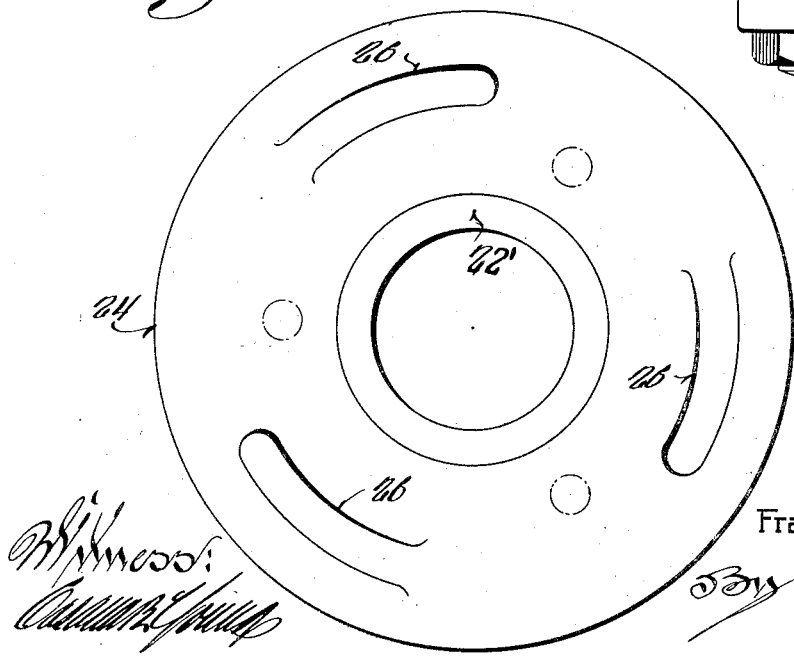
Inventor:
Frank Tamborello F. TAMBORELLO.
VEHICLE BRAKE MECHANISM.
APPLICATION FILED APR. 21, 1920.
1,393,051.
Patented Oct. 11, 1921.
3 SHEETS—SHEET 3.
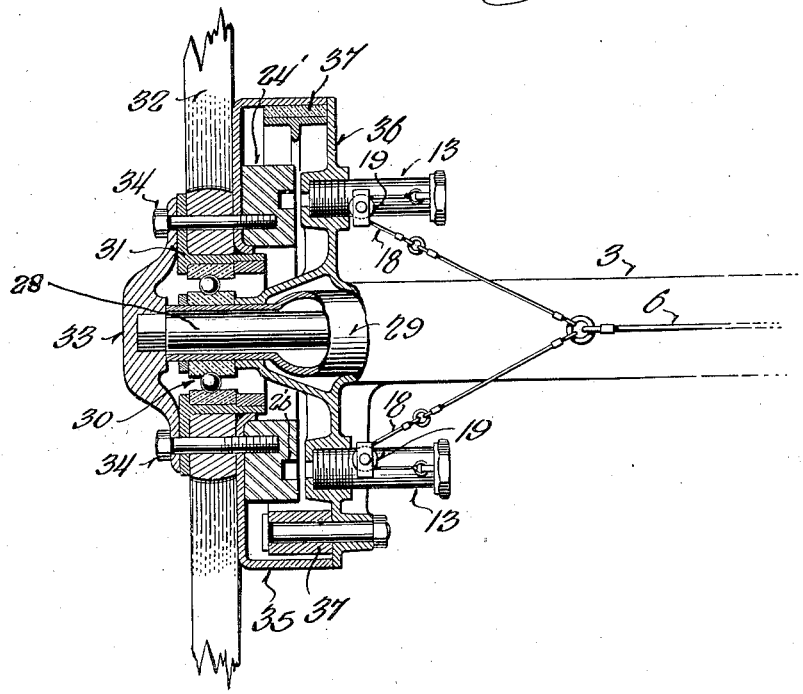
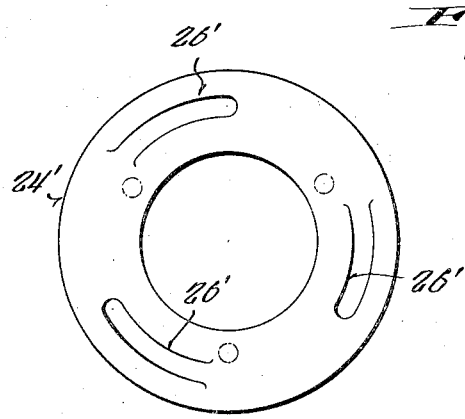
Inventor:
Frank Tamborello

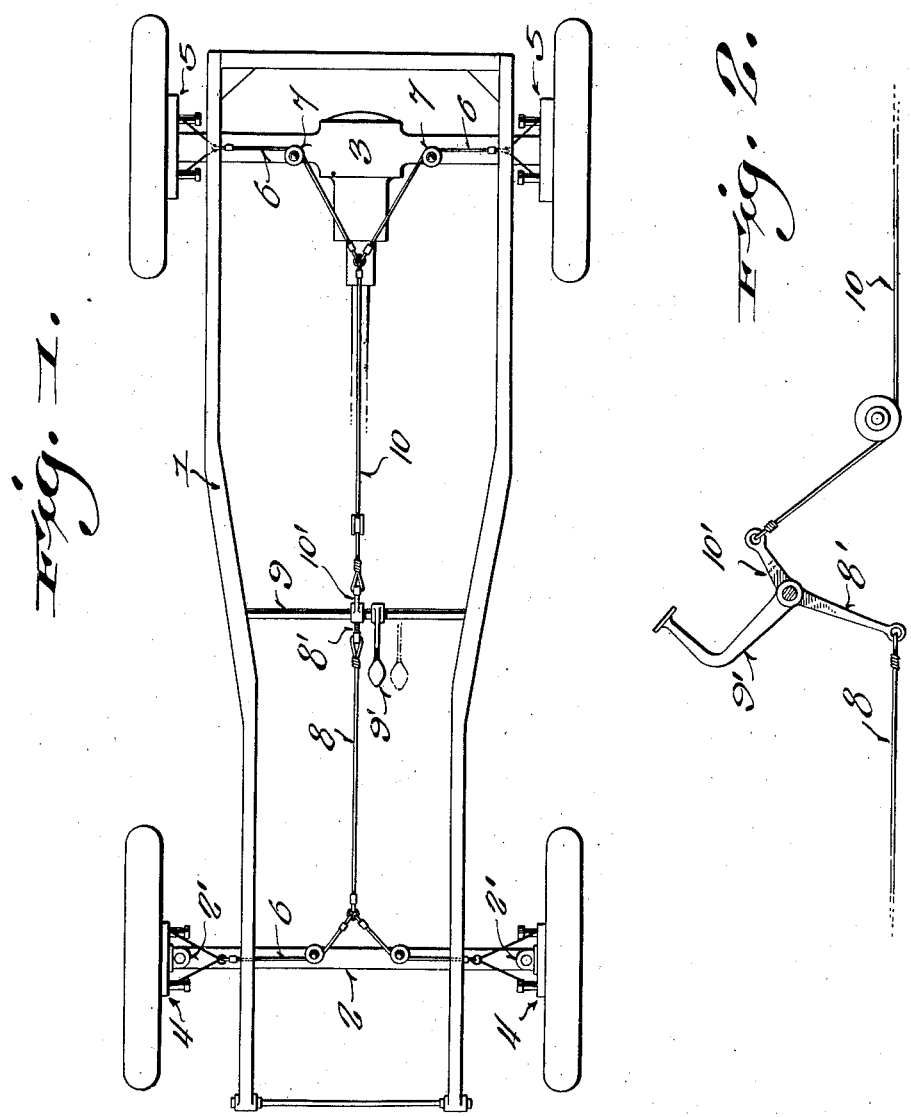

UNITED STATES PATENT OFFICE.

FRANK TAMBORELLO, OF MILWAUKEE, WISCONSIN.

VEHICLE BRAKE MECHANISM.

1,393,051.    Specification of Letters Patent.    Patented Oct. 11, 1921.

Application filed April 21, 1920. Serial No. 375,639.

*To all whom it may concern:*

Be it known that I, FRANK TAMBORELLO, a citizen of the United States, and resident of Milwaukee, in the county of Milwaukee and State of Wisconsin, have invented certain new and useful Improvements in Vehicle Brake Mechanism; and I do hereby declare that the following is a full, clear, and exact description thereof.

This invention relates to motor vehicle brakes and more particularly of that type of brake used in addition to the service brake and known as an emergency or quick acting brake.

At the present time it is customary to equip only the rear wheels of a motor vehicle with braking devices thereby throwing all of the strain upon these wheels and depending solely upon their traction to stop the vehicle. This often results in sliding and skidding. Furthermore all of the brakes used at the present time employ gripping means that rely upon friction to effect a braking. This is not positive and in cases where the brakes are slightly worn or improperly adjusted it is impossible to stop the vehicle within the desired space.

In order to overcome these objectionable features the primary object of my invention is to provide a device to take the place of the usual emergency brake that is adapted to quickly and positively lock the wheels of a vehicle against movement.

A further object is to provide a brake so constructed and operated that it is adaptable to be used upon the four wheels of a vehicle thus assuring a quick stopping of the same.

A more specific object is to equip the four wheels of a vehicle with a brake of this character and provide a flexible operating means which will permit swinging of the wheels without affecting its operation.

With the above and other objects and advantages in view, which will be apparent as the description proceeds, my invention resides in the novel features of construction, combination and arrangement of the parts as hereinafter described and defined by the appended claims.

In the accompanying drawings:

Figure 1 is a plan view of an automobile chassis showing my invention attached thereto and the manner of operating the same.

Fig. 2 is a fragmentary detail showing the actuating levers.

Fig. 3 is an enlarged detail sectional view of the braking mechanism as applied to the front wheels of the vehicle.

Fig. 4 is detail elevational view of the rotary brake plate employed in the braking mechanism of the front wheels.

Fig. 5 is a cross sectional view through the rear wheel and its associated braking mechanism.

Fig. 6 is a detail elevational view of the rotary brake plate carried by the rear wheel.

Referring now more particularly to the accompanying drawings, numeral 1 designates an automobile frame to which are attached front and rear axles 2 and 3 respectively. The front axle 2 is provided with the customary steering knuckles 2' upon which are mounted steering and braking devices 4, which I shall described specifically later in the specification.

Mounted upon the rear axle and associated with the rear or driving wheels are the brake mechanisms 5 similar in construction to the braking devices 4 and differing only in the manner of their attachment. Connected to both braking devices 4 and 5 are suitable cables 6 passing over the pulleys 7 carried by the front and rear axles. The front cables 6 after passing over the pulleys 7 are secured to a central actuating cable 8 secured to an arm 8' of an actuating lever mounted upon a rocker shaft 9 which in turn is actuated by a suitable foot lever 9'. The rear cables 6 are connected to a central actuating cable 10 secured to the arm 10' of the actuating lever. Thus it will be seen that upon rocking the shaft 9 by means of the foot pedal 9' movement will be transmitted through the cables 8 and 10 and thence through the cables 6 to the braking devices 4 and 5. The foot pedal 9' for actuating the braking devices is preferably positioned adjacent the service braking pedal shown in Fig. 1, in dotted lines. This will permit the driver to quickly shift from the service pedal, which is used under ordinary conditions to gradually reduce the speed of the car, to the emergency brake pedal 9' when a quick stop is desired.

Taking up in detail the construction and operation of the braking devices 4, as shown in Fig. 3, the spindle 11 of the steering knuckle 2', is provided with a squared portion 11' at its inner end, upon which is mounted and locked against rotation a plate 12.

Threaded into the plate 12 are a plurality of plunger cylinders 13, which are reduced interiorly at their threaded ends to form a bearing 14 for a plunger 15, which plunger is provided with an enlarged head 16 approximately of the same diameter as the interior of the cylinder thereby affording a bearing for the upper end of the plunger. Projecting from the head 16 through slots 17 in the wall of the cylinder 13 are ears 16' to which are secured cables 18 adapted to pass over pulleys 19 secured to the sides of the cylinder 13. Disposed between the head 16 and the reduced interior portion of the cylinder is a compression spring 20 adapted to retain the plunger within the cylinder until such time as the cables 18 are actuated, whereupon it will be seen that the plunger will be forced out of the cylinder through an opening 21 in the plate 12, which opening is in register with the bearing 14 of the plunger cylinder 13.

Carried upon the spindle 11 and mounted upon the usual anti-frictional bearings is a wheel hub 22 to which are secured in the customary manner spokes 23. The inner portion of the hub 22 is provided with a flange 22' upon which is mounted a braking plate 24, the same being secured to the hub by means of the spoke retaining bolts 25, and adapted to rotate with the wheel. The inner surface of the braking plate 24, which abuts the plate 12 is provided with inclined notches 26 in register with the openings 21 of the plate 12, for the purpose of receiving the plungers 15 when the same are projected from the cylinders 13.

In order to prevent mud and water from becoming lodged between the plates 24 and 12, a lip 27 carried by the plate 12 projects over the periphery of the plate 24.

Taking up the operation of the braking mechanism I have just described it will be seen that as tension is exerted upon the cables 18 the plungers 15 will be projected from the cylinders 13 and will engage the notches 26 of the braking plate 24, thereby locking together the plates 24 and 12 and inasmuch as the plate 12 is secured against movement a quick and positive locking of the wheel which carries the plate 24 will be obtained. As the tension upon the cables 18 is released the spring 20 forces the plungers back into the cylinders, thereby releasing the plates 24 and permitting the wheels to rotate.

In the rear braking devices 5, as illustrated in Fig. 5, the axle 28, is provided with a housing 29 of standard construction and upon which is mounted an anti-frictional bearing 30 that in turn carries a hub member 31 about which are disposed in the customary manner spokes 32. Secured to the end of the axle 28 is a cap 23, locked to the hub 31 by means of spoke retaining bolts 34, which bolts also serve to secure a brake drum 35 and a brake plate 24', similar in construction and function to the brake plate 24, to the wheel.

Formed integrally with the rear axle housing is the usual axle spider 36, which carries a service brake 37 adapted to frictionally engage the inner periphery of the brake drum 35.

Threaded into the axle spider 36 at suitably spaced intervals are a plurality of plunger cylinders 13 which have been previously described and shown in detail in Fig. 3. The plungers 15 positioned within the cylinders are adapted to be projected into grooved notches 26' of the braking plate 24' and inasmuch as the axle spider is stationary it will be readily seen that upon such action the rear wheels, which carry the braking plates 24', will be instantaneously locked against movement.

As the front wheels of the vehicle are swung, for the purpose of steering a slight tension will be exerted upon cables 18 of certain of the plunger cylinders 15, and tend to cause the plungers to be projected into their locking position.

In order to overcome this it will be noted as best shown in Fig. 3 that considerable movement is provided between the end of the plunger 15 and the notches 26, which will permit a predetermined action of the plunger without effecting a locking of the front wheels.

To compensate for this lost movement of the plunger 15 as provided in the braking devices 4, the arm 8' of the actuating lever is somewhat longer than the arm 10' thereby giving greater movement to the front actuating cable 8 than to the rear cable 10. From the foregoing description taken in connection with the drawings, it will be seen that a comparatively simple and efficient braking mechanism has been constructed which can be used in a standard type of motor vehicle without requiring radical changes in its construction. It is, of course, to be understood that ordinarily the usual service brake will be used to stop the motion of the vehicle. The purpose of the present invention is to provide a quick and positively acting device which is to be used only in case of great emergency, when without such a device, an accident is likely to occur.

What is claimed is:

1. In a vehicle having a stationary axle and a wheel mounted thereon, a braking plate provided with notches, a stationary plate carried by the axle, a cylinder carried by said stationary plate, a plunger disposed within said cylinder, a spring for urging the plunger into said cylinder, pulleys mounted upon the sides of the cylinder and cables connected to the plunger and passing over said pulleys for projecting the plunger from the cylinder to engage said notches and lock the braking plate against movement.

2. In a vehicle having a stationary axle and a wheel mounted thereon, a brake drum carried by the wheel, a braking plate positioned within said drum and secured to the wheel, a stationary plate carried by the axle, a service brake secured to said stationary plate and adapted to engage the inner periphery of the brake drum, a cylinder carried by said stationary plate, a plunger disposed within said cylinder and means for projecting the plunger to engage said braking plate and lock the wheel against movement.

In testimony that I claim the foregoing I have hereunto set my hand at Milwaukee, in the county of Milwaukee and State of Wisconsin.

FRANK TAMBORELLO.